ус007961608B2

(12) United States Patent
Couturier

(10) Patent No.: US 7,961,608 B2
(45) Date of Patent: Jun. 14, 2011

(54) CONTROL FOR ADMISSION TO A DATA NETWORK FOR PROVIDING SERVICE QUALITY

(75) Inventor: Alban Couturier, Chatillon (FR)

(73) Assignee: Alcatel, Paris (FR)

( * ) Notice: Subject to any disclaimer, the term of this patent is extended or adjusted under 35 U.S.C. 154(b) by 2596 days.

(21) Appl. No.: 10/361,491

(22) Filed: Feb. 11, 2003

(65) Prior Publication Data

US 2003/0152029 A1 Aug. 14, 2003

(30) Foreign Application Priority Data

Feb. 14, 2002 (FR) ...................................... 02 01847

(51) Int. Cl.
H04J 3/14 (2006.01)
(52) U.S. Cl. ........................................ 370/230; 370/235
(58) Field of Classification Search .......... 370/229–232, 370/235, 236, 236.1, 238, 252–253, 542, 370/463
See application file for complete search history.

(56) References Cited

U.S. PATENT DOCUMENTS

| | | | | |
|---|---|---|---|---|
| 5,687,167 A * | 11/1997 | Bertin et al. | ................... | 370/254 |
| 5,881,050 A | 3/1999 | Chevalier et al. | ............. | 370/230 |
| 6,028,842 A * | 2/2000 | Chapman et al. | ............. | 370/235 |
| 6,061,559 A * | 5/2000 | Eriksson et al. | ........... | 455/435.3 |
| 6,081,513 A * | 6/2000 | Roy | ................................ | 370/260 |
| 6,643,258 B1 * | 11/2003 | Ise et al. | ......................... | 370/230 |
| 6,678,264 B1 * | 1/2004 | Gibson | ......................... | 370/352 |
| 7,068,666 B2 * | 6/2006 | Foster et al. | ................... | 370/397 |
| 7,457,287 B1 * | 11/2008 | Shaffer et al. | .................. | 370/389 |
| 7,756,092 B1 * | 7/2010 | Ho et al. | ......................... | 370/338 |
| 2001/0036157 A1 * | 11/2001 | Blanc et al. | .................... | 370/235 |
| 2002/0181462 A1 * | 12/2002 | Surdila et al. | .................. | 370/392 |
| 2002/0194362 A1 * | 12/2002 | Rawlins et al. | ............... | 709/235 |
| 2003/0084144 A1 * | 5/2003 | Lipinski | ......................... | 709/224 |
| 2003/0133459 A1 * | 7/2003 | Siddiqui et al. | ........... | 370/395.21 |
| 2004/0013089 A1 * | 1/2004 | Taneja et al. | .................... | 370/235 |

FOREIGN PATENT DOCUMENTS

| | | |
|---|---|---|
| EP | 0398037 A2 | 11/1990 |
| EP | 0714192 A1 | 5/1996 |
| EP | 1067736 A2 | 1/2001 |

* cited by examiner

Primary Examiner — Pankaj Kumar
Assistant Examiner — Saba Tsegaye
(74) Attorney, Agent, or Firm — Sughrue Mion, PLLC

(57) ABSTRACT

Control for admitting microflows to a data network consisting of allocating logic priority levels to these microflows making it possible to implement a microflow preemption order based on this logic priority. If the service quality required for a new microflow A cannot be ensured by the internal resources of the network, it is thus possible to free the internal resources of said network by preempting a lower logic priority microflow B.

19 Claims, 3 Drawing Sheets

CONTROL FOR ADMISSION TO A DATA NETWORK FOR PROVIDING SERVICE QUALITY

The present invention concerns control of service quality on a data network. It more specifically applies to data networks allowing the supply of various services, such as transmission of voice, data, video etc. This network can for example be a network based on the protocols of the TCP/IP (Transport Control Protocol/Internet Protocol) family, that is the type commonly known as Internet.

Certain services require an expressed reservation of resources within the network. In fact, certain networks, such as Internet, have been provided to transmit data, but neither the voice nor video. Within the Internet, the transmissions of data are carried out in the form of packets, each packet being routed to its destination independently of the other packets. Each packet is traditionally identified by a IP header, a 5-tuple: protocol used, address, address and transmitter port, address and port of the recipient. The Ip header can include other more specific data concerning the packet in question (length).

The term microflow is generally understood to be a set of packets which has the same 5-tuple or at least the same 4-tuple. In effect, the IP header is unable to include identification of the port of the transmitter. In the rest of the description, the term microflow covers these two possibilities. The term flow is understood to be a set of packets or microflows having at least one common parameter of the IP header.

So as to transmit the flow of packets corresponding to the voice or images by means of these networks, it is necessary to reduce the rate of losses of the packets and also the transmission time so as to ensure effective listening or sufficient viewing for the recipient of the transmission. This minimization of the loss rate of packets and the transmission time is normally carried out via the reservation of internal resources within the nodes of the network (or routers).

To sum up, in practice, the terminal wishing to obtain a certain service quality for a specific flow transmits a service quality request for said flow before sending the corresponding packets.

Generally speaking, the service quality request is a resource reservation request, for example conforming to the RSVP (Reservation protocol) as defined by the RFC 2205 of the IETF (Internet Engineering Task Force).

According to said RSVP protocol, each router receiving a resources reservation request must initially verify the resources asked for are available and route the request according to conventional routing algorithms. The resources reservation request thus follows a path which shall be normally that of the packets of the flow in question until it reaches the addressee. The latter then sends a reply to the initial transmitter which will ascend the path via an opposite direction. During this second passage, each router shall effectively reserve the requested resources.

With this type of protocol, each router needs to ensure the maintenance of the processing context corresponding to the service quality request which has been asked for. In particular, if a router of the network processes four flows, it needs to manage four corresponding stand-by files, that is one per flow.

The DiffServ (Differentiated Services model) architecture as defined by the RFC 2475 of the IETF offers a different resources reservation mechanism. Said mechanism is based on a priority marking of the packets of the IP flows. According to this architecture, the control of service quality is implemented by the allocation of priorities, called colours in this context, to each packet of a flow. The coloured packets need to be processed according to their priority by the router receiving them. The router no longer has to manage standby files per flow, but only a single standby file. In practice, the priority levels generally correspond to the nature of the flow. A voice traffic must have the highest priority, known as "expedited forwarding" in the DiffServ architecture, whereas a Web traffic ought to have the lowest precedence, known as "Best Effort" in the DiffServ architecture.

In practice, the RSVP or DiffServ solutions are complementary to each another so that the networks architectures of the prior art generally simultaneously implement the two protocols so as to make use of their respective advantages.

An implementation example of the prior art is shown on FIG. 1. A description of said such prior art can be found in the RFC 2998 document entitled "A Framework for Integrated Services Operation over DiffServ networks".

The data network N comprises the routers $R_1$, $R_2$, $R_3$, $R_4$, $R_5$, $R_6$. Some of these routers are Edge routers $R_1$, $R_2$, $R_3$, that is they are equipped with means for communicating with terminals, office-based applications or routers outside this data network N. The other routers $R_4$, $R_5$, $R_6$ are internal routers which only have means for communication with other internal routers of the data network N.

In addition to the edge routers, the network may comprise other types of edge equipment. For example, this equipment may be gateways whose function is to transmit and arrange without having to carry out IP routing (Internet protocol).

According to this prior art, the edge equipment (routers, gateways, etc) are able to use the RSVP protocol, whereas the internal routers mainly use the DiffServ mechanism. But it is also possible to have certain internal routers which use the RSVP protocol, only a core network implementing the DiffServ protocol. It is also possible to have "All" DiffServ networks.

In the network shown on FIG. 1, if a terminal $T_1$ initiates a flow requiring a certain service quality, with the terminal $T_3$, for example a vocal communication which requires, apart from other things, a minimum transmission period, it sends a resources reservation request according to the RSVP protocol. This resources reservation request is received and then processed by the edge equipment $R_1$. The latter then checks to see if there are effectively the required internal resources (especially the passband) so as to provide the requested service quality. It also checks in particular that the current aggregation of the flows at its outlet make it possible to accept this new flow.

If appropriate, the edge equipment $R_1$ can transmit a reply to the terminal $T_1$ informing it that the resources reservation has been effectively carried out.

The terminal $T_1$ then sends the packets of the flow to the addressee terminal $T_3$.

In accordance with the DiffServ mechanism, the router $R_1$ marks each of the packets of the flow it receives with the precedence allocated to the flow according to the resources reservation request previously received. This is the "Code Point".

The packets are routed inside the data network N via the" routers $R_1$, $R_4$, $R_5$, $R_6$ and $R_3$.

The router $R_3$ then sends the flow of packets to the terminal $T_3$ and the service quality request according to the RSVP protocol is sent to this terminal T3.

More generally, each of the routers of the network receives the packets which may correspond to various flows initiated in the network N. All these packets are marked with a precedence according to the DiffServ mechanism. Each router processes the packets it receives according to the precedence (such as "Expedited Forwarding", "Best Effort") allocated to it.

This solution of the prior art presents a problem since the verification of the available resources is only carried out by the edge equipment. If two service quality requests are, for example, initiated on two separate edge equipment elements, the following may result for an internal router of the network find it impossible to satisfy the requested service quality. The two service quality requests could be granted when one or even both could not be satisfied. In addition, the number of levels of precedence which may be granted according to the DiffServ mechanism is limited. Thus, all the flows corresponding to the voice traffic shall generally have the same DiffServ precedence and typically the precedence known as "Expedited Forwarding". Thus, each router shall process the "voice quality" type packets with the same precedence. If a congestion problem occurs to a router receiving several flows of this type, this shall result in an arbitrary deterioration of service quality for at least one of these flows.

This type of problem is common to all those solutions based on an admission control carried out by the equipment of the network. This for example is the case with the solutions described by the European patent applications EP 0714 192 from the IBM company and the document EP 0398 037 of the Toshiba company.

So as to illustrate this problem, if one looks again at the network N shown on FIG. 1, in the case where the terminal $T_2$ initiates a second service quality request from the edge equipment $R_2$ for a new flow of packets. This second request undergoes the same processing as the request initiated by the terminal $T_1$ ands is similarly intended for the terminal $T_3$.

This new flow of packets initiated by the terminal $T_2$ follows a path $R_2$, $R_6$, $R_5$ and $R_3$ as far as the terminal $T_3$.

One portion of this path $R_5$, $R_3$ is common with the path borrowed by the flow of packets derived from the terminal T.

If one considers the case of an inexpensive configuration of the network, the links $R_5$-$R_3$ shall have been dimensioned so as to accept certain volume of simultaneous communications, a volume which in practice ought only to be exceeded in certain statistically rare situations.

Thus, if the sum of the flowrates of the two flows of packets initiated by the terminals $T_1$ and $T_2$ is greater than the maximum possible flowrate on the path $R_5$-$R_3$, the router $R_5$ shall not be able to satisfy the service quality requested by at least one of the terminals $T_1$ or $T_2$ As the two flows allocate the DiffServ "Expedited Forwarding" precedence, these two packet flows shall be downgraded.

Because of this mechanism, it is possible to have a significant difference between the service quality asked for by the terminals and accepted by the network and the one effectively supplied due to a congestion of the traffic at the level of an internal node.

One solution is having a server which shall carry out calculations (algorithms) so as to determine congestion inside the network and accept or not accept a new flow request.

In the present invention, a case is considered where these networks exist with a server of this type able to determine if the acceptance of a new microflow could result in congestion on at least one node of the network.

The object of the present invention is then to determine which microflow needs to be stopped or refused inside the network so as to prevent congestion. If a microflow already initiated in the network is stopped, the internal resources are freed which makes it possible to accept a new microflow. Otherwise, the new microflow is refused.

According to the invention, a mechanism for allocating a logic priority to each microflow is implemented by the application requesting service quality. This logic priority enables each network concerned by transporting a microflow to implement a microflow preemption logic in an associated admission controller.

In this way, it is possible to design data networks cheaply based on a statistical analysis of the flows to be processed with optimum service quality management.

More specifically, the object of the invention concerns an admission control inside a network having a certain number of edge equipment elements for receiving the microflows to be transmitted in said network, said system being characterized in that an application requesting service quality for transmitting a microflow in the network includes means for allocating a logic priority to said microflow, said network including an admission controller comprising means to receive a request for service quality associated with said microflow to be transmitted and the logic priority which has been allocated to it and means to accept or prohibit said microflow.

The means to accept said microflow include means for determining an order for the preemption of the microflows in the network according to their logic priority so as to free the internal resources of the network with the aim of assessing the service quality requested by said microflow via the lowest logic priority microflow preemption.

In one embodiment of the invention, the admission controller associated with a network determines according to its preemption rules the microflow(s) to be preempted and informs the application of this.

In another embodiment of the invention, the admission controller is able to collaborate with said application for determining the flows to be preempted by providing it with a list of microflows which could be preempted.

According to the invention, for each network which a microflow will traverse, the admission controller associated with this network is informed by the admission controller associated with the preceding network of the logic priority allocated to the microflow.

Thus, by using an admission controller according to the invention, a new microflow can be admitted into the network only if the service quality requested can effectively be satisfied by interrupting, if appropriate, using a preemption mechanism one or the packet microflows already initiated in the network and allocated with the lowest logic priority.

It is therefore possible to avoid any over-supplying of the resources of the data network and obtain inexpensive architectures based on their statistical use.

The invention and its advantages are shown hereafter more clearly in the following description of embodiments with reference to the accompanying drawings on which:

FIG. 1, already described, represents a network architecture of the prior art using resources reservation mechanisms;

Figure 1:
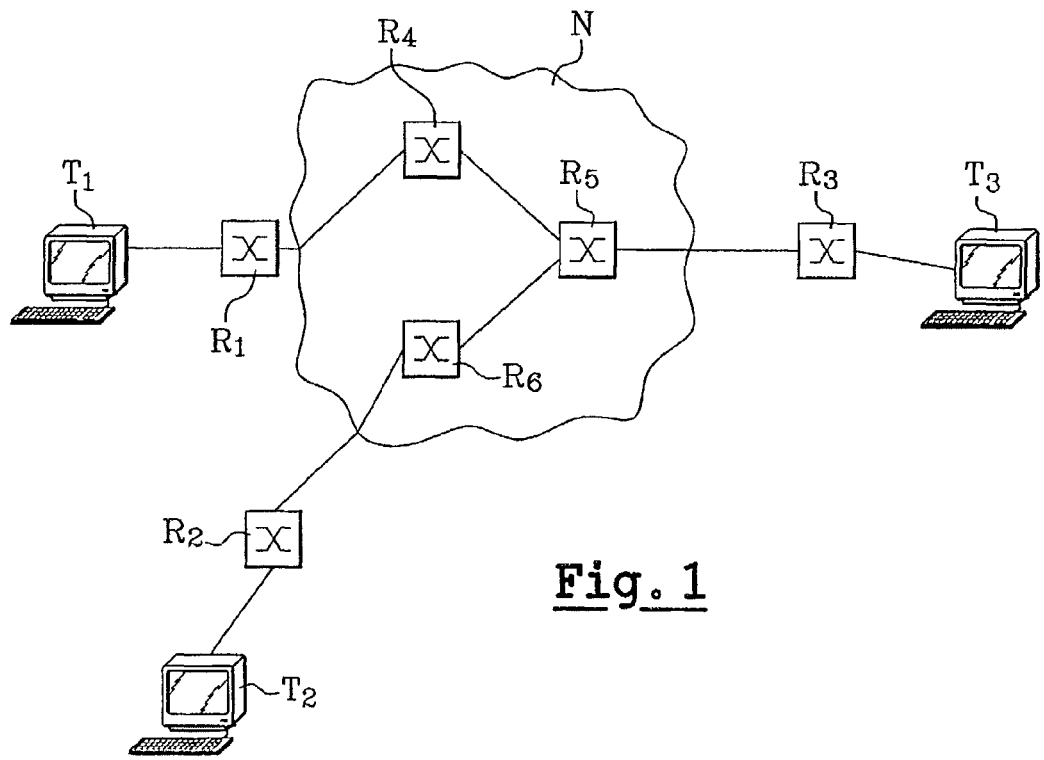
Figure 2:
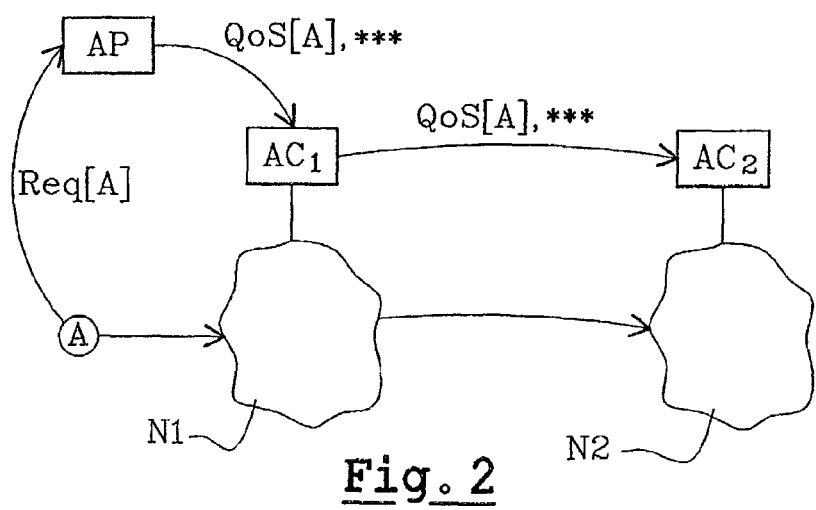
FIG. 2 illustrates the general principle of an admission control system according to the invention.

FIG. 2 diagrammatically represents the admission control principle applied to a microflow A transmitted by a transmitter, which can be any terminal, an office-based application, an external router, etc.—to be transmitted via a first data network $N_1$ and a second data network $N_2$. Each data network N comprises a set of edge equipment and internal resources (not shown) for transmitting the microflow.

According to the general principle of the invention, the transmitter of the microflow A sends a service request Req(A) to an application AP. According to the invention, the application allocates it with a service quality level and a logic priority level. For example, when this concerns a voice transmission originating from a station identified as the most important (for example from the Director of a company), the application AP shall allocate an extremely high level of logic priority noted *** in the example.

This application then transmits the service quality request QoS (A), *** and the logic priority which it has allocated to the admission controller AC of the first network. If the admission controller includes means for detecting congestion in the network $N_1$ and if it has calculated that there will be congestion, it shall either refuse the microflow A or authorize it but by stopping other microflow(s) already initiated in the network but allocate with a lower logic priority. Thus, the internal resources are freed by the microflow preemption based on the logic priorities associated with the microflows.

Moreover, the admission controller sends the admission controller $Ac_2$ of the next network $N_2$ the service quality request and the logic priority allocated to the microflow.

Generally speaking, via an admission control system according to the invention, the logic priority allocated to the microflow is transmitted to each of the admission controllers associated with the networks through which the microflow shall pass.

Preemption means can then be used, if appropriate, in the admission controller if the latter is able to detect whether the admission of the new microflow could result in a problem in a node or several nodes of the network. In basically dimensioned networks or more generally in which it is certain there are no congestion problems, the admission controller shall simply send the following admission controller the service quality request and the logic priority associated with the microflow.

In the case of a DiffServ type architecture, the microflow is allocated (or is already allocated) with a priority level of the traffic IP called 'precedence'. For example, a voice traffic is normally allocated a maximum precedence, namely "Expedited Forwarding", and a Web traffic, namely a "Best Effort" low precedence.

The logic priority allocated by the admission control system of the invention makes it possible to allocate to microflows of the same precedence a different logic priority permitting the preemption of one flow on another according to the logic criteria defined in the application and not according to the traffic IP.

For example, the logic priority level added to the microflows could depend on the identity of the user of the terminal.

The admission controller of the invention knows the list of flows initiated by each of the edge equipment and the logic priority which has been allocated to them.

Thus, via a knowledge of this information, the admission controller is able to determine as to whether or not the network can satisfy the new service quality initiated by a terminal.

In the case where the admission controller carries out calculations (uses algorithms) to determine whether the current use of the network is able to provide the service quality requested for the new microflow, the admission controller looks, if appropriate, for the list of lowest logic priority microflows initiated in the network.

Figure 3:
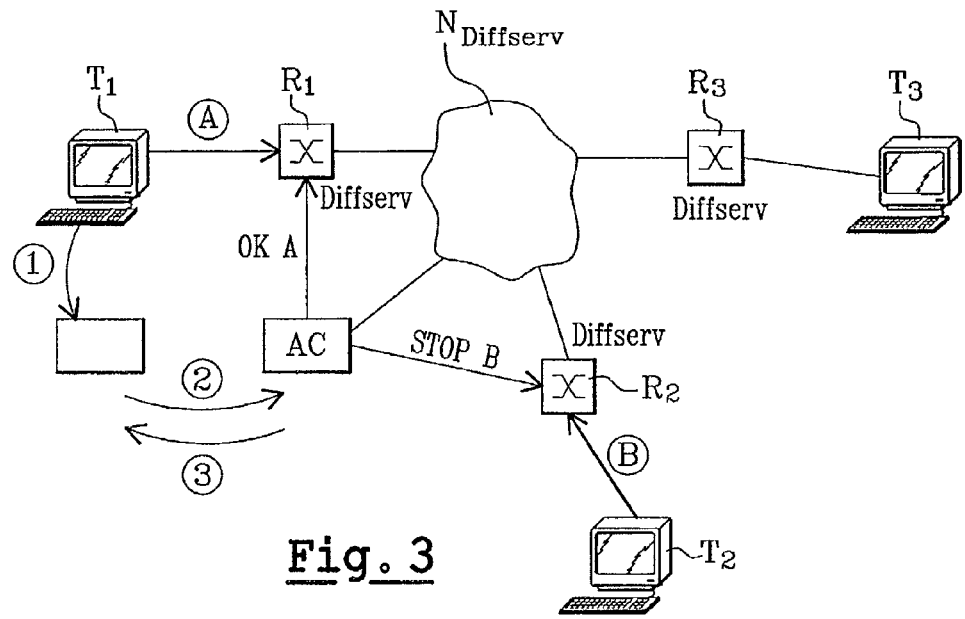
FIG. 3 illustrates a first embodiment example of the invention in an all DiffServ type architecture network

One embodiment example of the invention inside a network with an "All DiffServ" architecture is shown on FIG. 3.

A transmitter of a new microflow A, namely the terminal $T_1$ in the example, sends a service request (1) concerning an application AP which may in practice be a call server, an SIP-proxy, an intermediate application, a gateway, etc. This request is made according to a protocol adapted to the application. This protocol can typically be of the SIP type ("Session Initiation Protocol") or even of the H.323 type of the ITU-T (International Telecommunication Union).

This application AP is able to carry out formatting, hypotheses of the correlation of several service quality requests, etc.

According to the invention, this application allocates a logic priority. In fact, this application has detailed knowledge of the microflow to be transmitted, especially from the transmitter to the recipient, and not only the from the addresses IP. This application then sends the service quality request (2) with the allocation of a logic priority, namely in the example a high priority noted *** for the flow A to the admission controller AC.

In the example shown on FIG. 3, a microflow B is already initiated in the network on the edge equipment (router) $R_2$. This microflow has been allocated by a low logic priority application (not necessarily by the application AP) noted *.

Two cases of the figure are shown: in the first case, the network has sufficient internal resources to accept the new microflow A, namely when it is dimensioned broadly or when the application environment is such that there is no problem of congestion. In the second case, the acceptance of the microflow A would result in problems of congestion, certainly at at least one node of the network, the admission controller having calculation means enabling it to detect this problem.

Two variants of a control system according to the invention can then be used.

In a first variant shown on FIG. 3, the admission controller selects from its list of microflows initiated in the network a least priority microflow, B in the example, and stops this microflow by sending a corresponding message, Stop B, to the edge equipment which has initiated it, $R_2$ in the example. It sends a message (3) to the application to inform it that the flow A has been accepted and which flows have been preempted. In the example, only the flow B is preempted.

The admission controller can then send back a message for accepting the microflow A to the edge router $R_1$ according to the protocol COPS. This message contains the normal opening rules (passband, maximum and minimum flows) linked to the precedence of the microflow, for example "Expedited Forwarding". The router $R_1$ can then transmit the microflow A.

Figure 4:
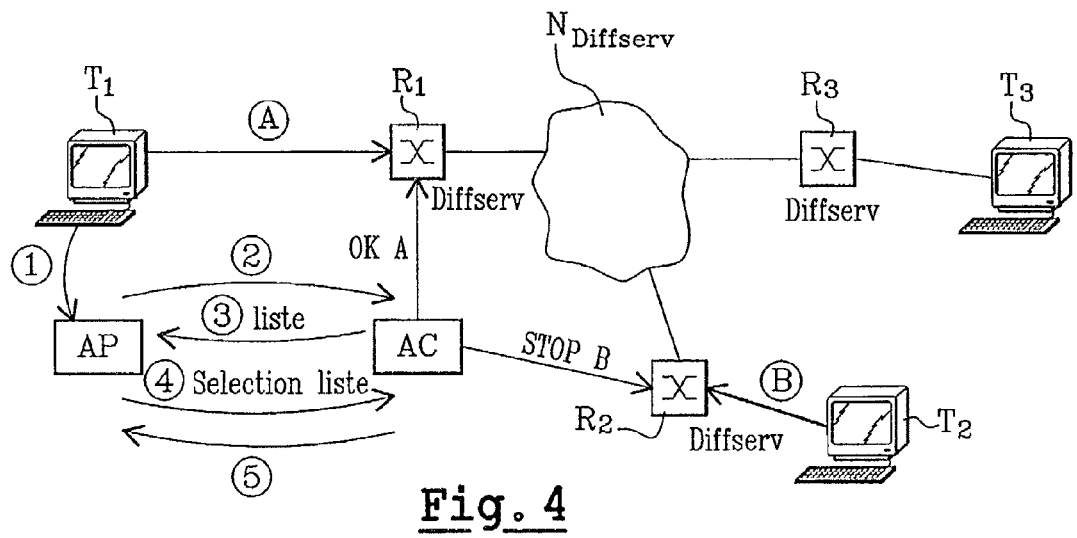
FIG. 4 illustrates a variant of the admission control mechanism for this network architecture.

In a second variant shown on FIG. 4, the admission controller collaborates with the application AP. It sends (3) this application a list of possible preempted flows. This list may include all the microflows initiated in the network with a least priority or solely one portion of them according to predetermined logic rules.

It is this application AP which then carries out the choice of preemption and duly informs (4) the admission controller. The admission controller AC can inform (5) the application the microflow(s) it has effectively stopped.

Figure 5:
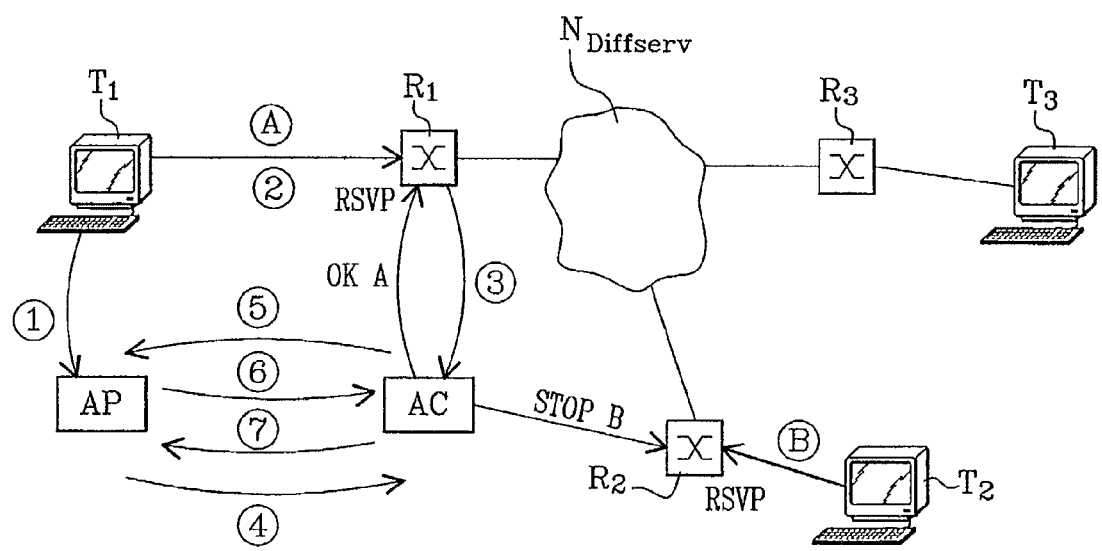
FIG. 5 illustrates a second embodiment example of the invention for a mixed RSVP/DiffServ type network architecture.

On FIG. 5, another implementation of the invention is shown for a mixed RSVP/DiffServ architecture. In this architecture, the terminal $T_1$ sends (1) a service request (SIP or H.323 protocol) to the application and sends (2) a resources reservation request according to the RSVP protocol to the edge equipment $T_1$. This edge equipment sends (3) this request to the admission controller AC. Moreover, the application AP allocates to the microflow A a logic priority, *** in the example, according to the mechanism already described with reference to FIG. 3. It sends (4) the admission controller AC this request and the logic priority of the microflow A.

If the admission controller AC receives the resources reservation request before receiving the message by the application AP of the corresponding service quality request, it informs the latter of the resources reservation request (3) and waits in return (4) for confirmation of the request and the allocation of the priority.

In all cases, the admission controller of the invention includes means to check that the parameters of the resources reservation request (3) clearly correspond to those contained in the service quality request transmitted (4) by the application AP. In the case where they do not correspond, the admission controller collaborates with the application so as to decide whether to accept or downgrade the service quality requested (3) by the edge equipment, which is expressed in the opening rules to be applied.

Next, if a congestion problem needs to be resolved, this can be sorted out by the two embodiment variants of the control system of the invention with reference to FIG. 3 (first variant) and FIG. 4 (second variant).

In the first variant, the admission controller chooses the flow(s) to be preempted according to the logic priority of the microflows already initiated in the network, stops these flows (Stop B), informs the application AP of this and sends a message accepting the microflow A to the corresponding edge equipment $R_1$.

In the second variant shown on FIG. 5, the admission controller collaborates with the application AP. It sends (5) this application a list of possible preempted flows. This list may include all the microflows initiated in the network with a least priority or only one portion of them according to predetermined logic rules.

This application AP, which carries out this preemption choice, duly informs (6) the admission controller. In all cases, the admission controller AC informs (7) the application of the microflow(s) it has effectively stopped. The admission controller then sends the message for accepting the microflow A, OK A, with opening rules corresponding to the service quality.

In this mixed RSVP/DiffServ architecture, the admission controller is able to implement the COPS protocol with the edge equipment.

With the admission control system of the invention, the network is able to accept a microflow requiring a certain level of service quality (passband, flows) and satisfy it by allowing the freeing of the internal resources of the network by preempting the microflows according to given criteria. For example, a service quality request for a Voice traffic originating from a transmitter corresponding to an important customer could benefit from a priority higher than a service quality request originating from a third party.

It is this application which implements the rules for allocating logic priorities. These rules are based on the intelligence of the service in the application.

In the case where the admission controller of a network has no means for detecting a congestion problem or that there are no possible congestion problems inside the network, the admission controller has the logic priority transmitted allocated by the application to the microflow which traverses the network.

What is claimed is:

1. An admission control system in a network having a certain number of edge devices for receiving microflows to be transmitted inside said network, said system comprising:

an application sending a service quality request for the transmission in said network of a microflow of said microflows to be transmitted, said application comprising means for allocating a logic priority to said microflow;

wherein said network comprises an admission controller comprising:
means for receiving said service quality request associated with said microflow, and the logic priority which has been allocated to said microflow; and
means to accept or prohibit said microflow; and wherein the means to accept said microflow comprise means for determining an order of preemption of the microflows in the network according to their logic priority, so as to free the internal resources of the network, with the aim of providing the service quality requested for said microflow by means of preempting and stopping one or more microflows with the lowest logic priority.

2. A system according to claim 1, wherein the admission controller of the network is able to transmit messages for accepting, prohibiting, or stopping microflows to a corresponding edge device of said network in accordance with the COPS protocol.

3. A system according to claim 1, wherein the means for determining an order of preemption are able to send the application asking for service quality a list of flows initiated in the network and allocated with a lowest logic priority and to receive from said application a selection of a microflow or microflows to be preempted.

4. A system according to claim 1, wherein the means for determining an order of preemption are able to send information indicating the preempted flows to the application that requested service quality.

5. An admission control system according to claim 1, wherein
the network comprises edge devices using the RSVP protocol; and
the admission controller is able to receive a request for reserving the resources of said edge devices using the RSVP protocol.

6. A system according to claim 5, wherein:
the admission controller is able to receive from an edge device a resources reservation request associated with said microflow; and
the admission controller includes means able to inform the application requesting service quality that the resources reservation request is received.

7. A system according to claim 1, wherein the admission controller associated with the network includes means for informing at least one admission controller associated with another network of the logic priority allocated to said microflow.

8. A system according to claim 1, wherein the logic priority of said microflow is not related to an IP traffic precedence of said microflow.

9. A system according to claim 1, wherein the logic priority of said microflow is assigned according to criteria defined in said application.

10. A system according to claim 1, wherein the logic priority of said microflow is assigned according to the user of a terminal transmitting said microflow.

11. A system comprising a communication network having a certain number of edge devices for receiving microflows to be transmitted inside a network, and an admission controller, comprising:
means for receiving from an application a service quality request associated with a microflow of said microflows to be transmitted, and a logic priority allocated to said microflow by said application;

means for accepting or prohibiting said microflow, according to said logic priority and the available resources inside said network; and means for prohibiting the transmission of said microflow by sending a message to the edge router corresponding to said microflow;

wherein the means for accepting or prohibiting said microflow comprises means for determining an order of preemption of already-initiated microflows in the network according to their logic priority, and for sending messages to edge routers to stop one or more of said already-initiated microflows according to said order of preemption, so as to free internal resources necessary to said microflow to be transmitted.

12. A system according to claim 11, wherein said service quality request is transmitted through the edge router corresponding to said microflow.

13. A method for an admission controller to manage transmission of data in a network, comprising:

receiving from an application a service quality request associated with microflow to be transmitted and a logic priority which has been allocated to said microflow by said application;

determining an order of preemption of microflows according to the logic priority of the microflows;

freeing internal resources of the network by preempting and stopping one or more microflows with a lowest logic priority; and accepting or prohibiting said microflow.

14. The method of claim 13, further comprising:

sending said application a list of microflows in the network having a lowest logic priority; and receiving from said application a selection of one or more microflows to be preempted.

15. The method of claim 13, further comprising:

informing at least one admission controller associated with another network of the logic priority allocated to said microflow.

16. The method of claim 13, further comprising:

sending information indicating the preempted microflows to the application that requested service quality.

17. A method according to claim 13, wherein the logic priority of said microflow is not related to an IP traffic precedence of said microflow.

18. A method according to claim 17, wherein the logic priority of said microflow is assigned according to criteria defined in said application.

19. A method according to claim 18, wherein the logic priority of said microflow is assigned according to the user of a terminal transmitting said microflow.

* * * * *